United States Patent
Na (10) Patent No.: US 10,274,398 B2
(45) Date of Patent: Apr. 30, 2019

(54) OPTICAL LINE TESTING DEVICE USING WAVELENGTH TUNABLE LASER TO MEASURE CUTTING POSITION OF OPTICAL LINE

(71) Applicant: SOLiD, INC., Seongnam-si, Gyeonggi-do (KR)

(72) Inventor: Keewoon Na, Yongin-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/539,267

(22) PCT Filed: Dec. 22, 2015

(86) PCT No.: PCT/KR2015/014061
§ 371 (c)(1),
(2) Date: Jun. 23, 2017

(87) PCT Pub. No.: WO2016/105066
PCT Pub. Date: Jun. 30, 2016

(65) Prior Publication Data
US 2018/0017464 A1   Jan. 18, 2018

(30) Foreign Application Priority Data
Dec. 24, 2014   (KR) ........................ 10-2014-0188002

(51) Int. Cl.
*G01M 11/00*   (2006.01)
*H04B 10/071*   (2013.01)
(Continued)

(52) U.S. Cl.
CPC .... *G01M 11/3127* (2013.01); *G01M 11/3181* (2013.01); *G01M 11/331* (2013.01);
(Continued)

(58) Field of Classification Search
CPC .............. H04B 10/071; H04B 10/0799; H04B 10/503; H04B 10/572; H04B 10/0795;
(Continued)

(56) References Cited

U.S. PATENT DOCUMENTS 5,771,250 A    6/1998   Shigehara et al.
5,923,414 A *  7/1999   Wagner .............. G01M 11/3127
                                                    356/73.1
(Continued)

FOREIGN PATENT DOCUMENTS

CN   1017646464    6/2010
JP   2010-139253 A   6/2010
(Continued)

OTHER PUBLICATIONS

Korean Notice to Submit Response issued in KR 10-2014-0188002 dated Nov. 5, 2015.
(Continued)

*Primary Examiner* — Michael P LaPage
(74) *Attorney, Agent, or Firm* — Sughrue Mion, PLLC (57) ABSTRACT

An optical line testing device for measuring at least a cutting position of an optical line according to the present invention includes: a first wavelength tunable laser source configured to generate a first optical signal in which a plurality of wavelengths appear alternately and periodically; a second wavelength tunable laser source configured to generate a second optical signal which is identical to the first optical signal but has an adjustable delay time; and an interferometer configured to cause interference between a reflected optical signal, corresponding to the first optical signal, which is returning after having been emitted to the optical line, and the second optical signal to output an interference signal.

15 Claims, 9 Drawing Sheets

(51) Int. Cl.
H04B 10/079 (2013.01)
H04B 10/50 (2013.01)
H04B 10/572 (2013.01)

(52) U.S. Cl.
CPC ....... H04B 10/071 (2013.01); H04B 10/0795 (2013.01); H04B 10/0799 (2013.01); H04B 10/503 (2013.01); H04B 10/572 (2013.01); G01M 11/3145 (2013.01)

(58) Field of Classification Search
CPC ......... G01M 11/3127; G01M 11/3181; G01M 11/3145
See application file for complete search history.

(56) References Cited

U.S. PATENT DOCUMENTS

| | | | |
|---|---|---|---|
| 2002/0131049 A1* | 9/2002 | Schmitt | G01M 11/3127 356/479 |
| 2006/0110161 A1 | 5/2006 | Cho et al. | |
| 2008/0144016 A1* | 6/2008 | Lewis | G01M 11/3127 356/73.1 |
| 2011/0001959 A1* | 1/2011 | Hasegawa | G01M 11/3172 356/73.1 |
| 2014/0362367 A1* | 12/2014 | Chen | G01M 11/3127 356/73.1 |

FOREIGN PATENT DOCUMENTS

| | | |
|---|---|---|
| KR | 10-1997-0028648 A | 6/1997 |
| KR | 10-2004-0023305 A | 3/2004 |
| KR | 10-2006-0056454 A | 5/2006 |

OTHER PUBLICATIONS

International Search Report of PCT/KR2015/014061 dated Mar. 28, 2016.
Shi Tangjunxiong "Light Beat Frequency and Interference Phenomenon" University Physics, No. 01, pp. 10-12, Dec. 1990.
Notice to Submit Response issued in the Chinese Patent Office in Chinese Application No. 201580070856.9 dated Sep. 4, 2018.

* cited by examiner

OPTICAL LINE TESTING DEVICE USING WAVELENGTH TUNABLE LASER TO MEASURE CUTTING POSITION OF OPTICAL LINE

CROSS-REFERENCE TO RELATED APPLICATIONS

This application is a National Stage of International Application No. PCT/KR2015/014061, filed Dec. 22, 2015, and claims priority from Korean Patent Applications No. 10-2014-0188002 filed Dec. 24, 2014, the contents of which are incorporated herein by reference in their entireties.

BACKGROUND

1. Field

The present invention relates to an optical line testing device such as an Optical Time Domain Reflectometer (OTDR), and more particularly, to an optical line testing device using a wavelength tunable laser.

2. Description of the Related Art

As communication volume increases, copper-based communication cables are replaced by optical fiber-based optical lines. The optical lines have been installed only in a section connecting a telephone office and a telephone office, but due to the increase in multimedia services such as Video On Demand (VOD), the optical lines are now being installed in homes or each room of the homes like a Fiber To The Home (FTTH). Therefore, as a service provider, management of numerous optical lines and detection of fault points have become very important in management of a communication network.

Figure 1:
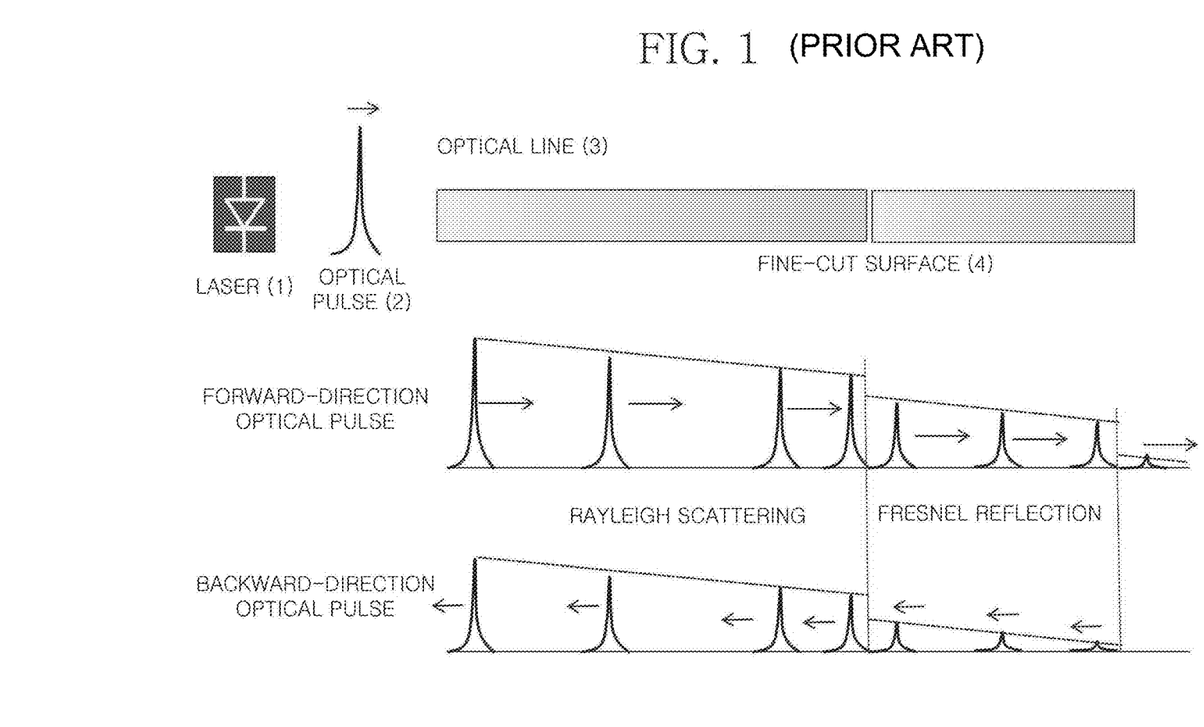
FIG. 1 is a view for explaining a measurement principle of a general OTDR.
Figure 2:
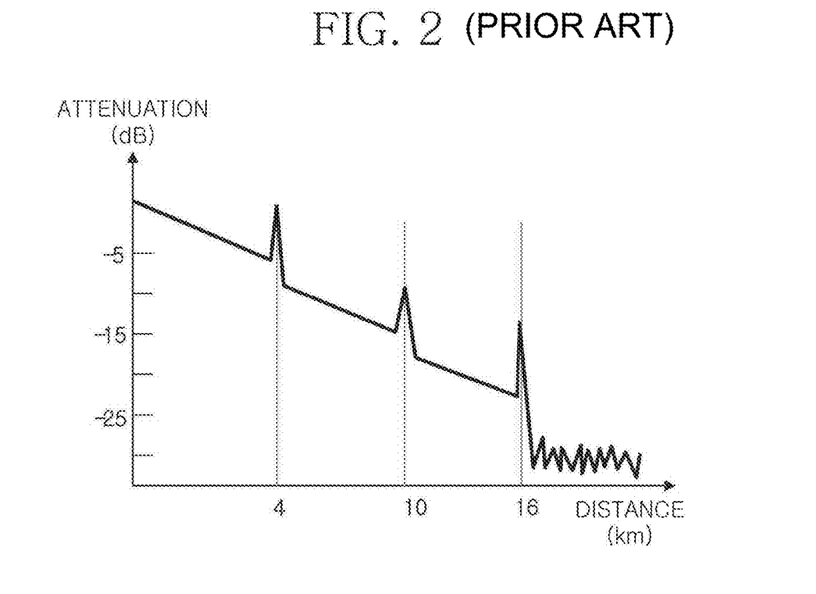
FIG. 2 is a graph of a signal waveform showing a measurement result of a general OTDR.

One of devices for managing the optical lines is an optical line testing device, for example, an Optical Time Domain Reflectometer (OTDR). As shown in FIG. 1, the OTDR generates an optical pulse 2 whose power is high and whose width is short in a laser 1, and enters the optical pulse 2 into the optical line 3 to be tested to start a test. If there is a fine-cut surface 4 somewhere in the optical line 3, the optical pulse 2 here makes a reflection pulse opposite to the traveling direction, receives the reflection pulse again, and generally displays the result like FIG. 2. Since an operating principle of the OTDR corresponds to a known technology, a detailed description thereof will not be given herein.

(References: Korean Patent Publications No,. 2004-23305 and No. 1997-28648).

However, a classical OTDR using an optical pulse is a useful tool for managing quality of an optical line in most cases, but has the following disadvantages.

First, it is difficult to increase a dynamic range. The dynamic range refers to a distance the OTDR can measure. To increase the range, it is necessary to increase magnitude of the optical pulse. However, if the magnitude of the optical pulse is increased beyond a threshold value, a nonlinear effect due to an interaction between the optical line and the optical pulse is strongly generated, and a shape of the optical pulse is distorted to cause a measurement error.

Figure 3:
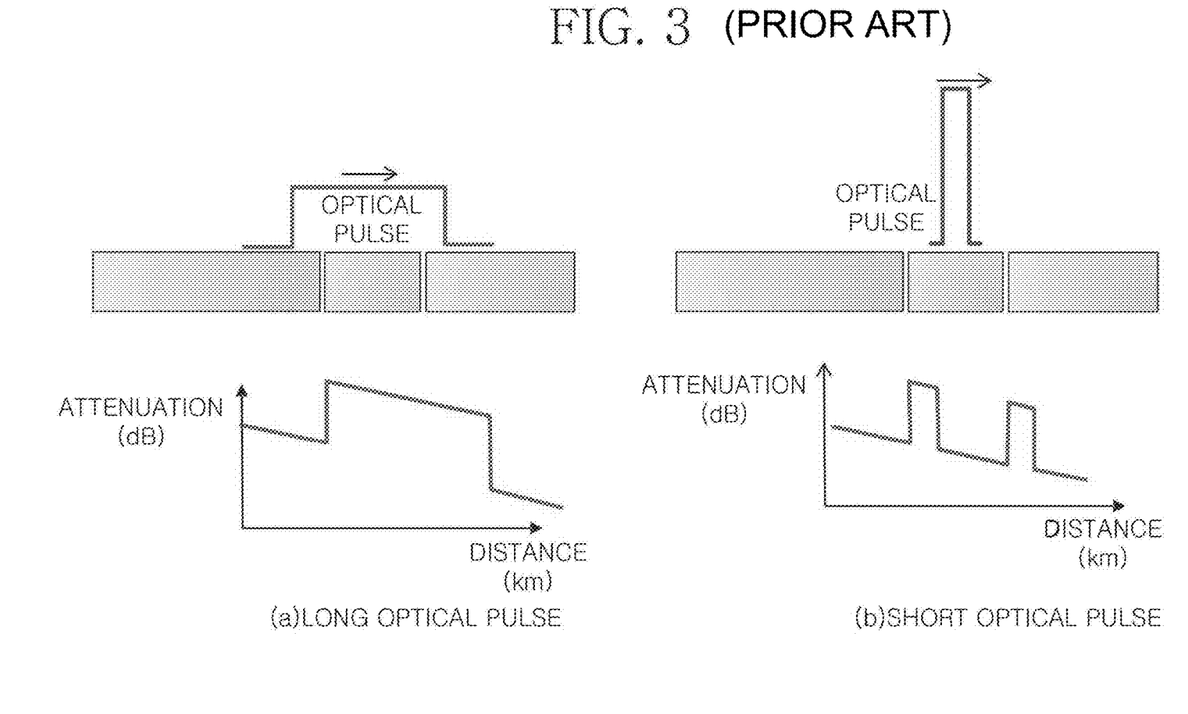
FIG. 3 is a view for explaining a relationship between an optical pulse width and a resolution.

At present, to avoid such an error, a length (width) of the optical pulse is increased instead of increasing the magnitude of the optical pulse. This increases the dynamic range. However, as the length (width) of the optical pulse increases, a resolution of the OTDR deteriorates as shown in FIG. 3. The resolution is improved as the length of the optical pulse is shorter. The resolution is represented by parameters such as an event dead zone and an attenuation dead zone and all of the parameters are connected to each other, so that if one property is improved, the other property is damaged.

Furthermore, an Erbium Doped Fiber Amplifier (EDFA) may be used as an alternative method for increasing the dynamic range. However, since a conventional method of the OTDR uses an optical pulse having extreme variations in optical power over time, it is inappropriate to use the EDFA for amplifying the optical pulse.

As described above, according to the prior art, there is a limit to further improve the dynamic range and the resolution, and therefore, a technique capable of solving the problem is required.

SUMMARY

The present invention is directed to an optical line testing device capable of improving a dynamic range and a resolution.

Furthermore, the present invention is directed to an optical line testing device capable of minimizing a nonlinear effect caused by an optical line and using an optical amplifier such as an Erbium Doped Fiber Amplifier (EDFA).

According to an aspect of the present invention, an optical line testing device for measuring at least a cutting position of an optical line, the optical line testing device includes:

a first wavelength tunable laser source configured to generate a first optical signal in which a plurality of wavelengths appear alternately and periodically (hereinafter, a period in which one wavelength appears repeatedly is referred to as a 'wavelength repetition period'); a second wavelength tunable laser source configured to generate a second optical signal which is identical to the first optical signal but has an adjustable delay time; and an interferometer configured to cause interference between a reflected optical signal, corresponding to the first optical signal, which is returning after having been emitted to the optical line, and the second optical signal to output an interference signal, and the optical line testing is configured to measure the output of the interference signal while varying the delay time.

According to another aspect of the present invention, an optical line testing device for measuring at least a cutting position of an optical line, the optical line testing device includes:

a first wavelength tunable laser source controlled by a first wavelength control signal to generate a first optical signal in which a plurality of wavelengths appear alternately and periodically (hereinafter, a period in which one wavelength appears repeatedly is referred to as a 'wavelength repetition period'); a second wavelength tunable laser source controlled by a second wavelength control signal which is identical to the first wavelength control signal but has an adjustable delay time to generate a second optical signal; and an interferometer configured to output an interference signal by causing interference between a reflected optical signal, corresponding to the first optical signal, which is returning after having been emitted to the optical line, and the second optical signal, and the optical line testing is configured to measure the output of the interference signal while varying the delay time.

The optical line testing device may further include a delay unit configured to output the second wavelength control signal by delaying the first wavelength control signal by the delay time.

The optical line testing device may configured to measure the output of the interference signal while varying the delay time.

The optical line testing device may be configured to calculate the cutting position by using a delay time at which the measured output becomes maximum.

The optical line testing device may be configured to measure an output of the interference signal while varying the delay time for two or more different wavelength repetition periods, and in all of the two or more different wavelength repetition periods, calculate the cutting position using a delay time at which the measured output becomes maximum.

The optical power of the first optical signal and the second optical signal may be constant or continuous.

The interferometer may include a polarization controller for matching polarizations of the reflected optical signal and the second optical signal.

The optical line testing device may further include an optical signal receiver configured to convert an optical signal output from the interferometer into an electrical signal.

According to still another aspect of the present invention, an optical line testing device for measuring at least a cutting position of an optical line, the optical line testing device includes:

two wavelength tunable laser sources configured to each generate an optical signal in which a plurality of wavelengths appear alternately and periodically (hereinafter, a period in which one wavelength appears repeatedly is referred to as a 'wavelength repetition period'), wherein a first optical signal generated from one of the two wavelength tunable laser sources is emitted to the optical line, a variable delay time is given to a second optical signal generated from the other one of the two wavelength tunable laser sources, and the optical line testing device is configured to measure the cutting position using an interference effect when the round trip time, corresponding to the first optical signal, which is returning after having been emitted to the optical line, is equal to or an integral multiple of the delay time of the second optical signal, and is configured to measure an output of an interference signal while varying the delay time.

According to an embodiment of the present invention, unlike an optical pulse, optical power of a used optical signal is constant or continuous, so that even if the optical power increases, a nonlinear effect between the optical signal and an optical line does not occur or decreases, and thus optical power of an optical signal for measurement may be increased. Therefore, a dynamic range may be greatly improved without sacrificing a resolution of an optical line testing device.

According to an embodiment of the present invention, it is possible to provide an optical line testing device with excellent resolution and dynamic range, and to precisely measure a cutting position or the like on a long-distance optical line.

Furthermore, according to an embodiment of the present invention, it is possible to minimize a nonlinear effect caused by a measured optical signal in an optical line so that an optical amplifier such as an Erbium Doped Fiber Amplifier (EDFA) may be used.

DETAILED DESCRIPTION OF EXEMPLARY EMBODIMENTS

Features and advantages of the present invention will become apparent from the following detailed description of the present invention with reference to the accompanying drawings, and it will be understood by those of ordinary skill in the art that various changes in form and details may be made therein without departing from the spirit and scope of the present invention. Furthermore, in the description of the present invention, certain detailed explanations of the related art are omitted when it is deemed that they may unnecessarily obscure the essence of the present invention. Reference will now be made in detail to embodiments of the present invention, examples of which are illustrated in the accompanying drawings.

Figure 4:
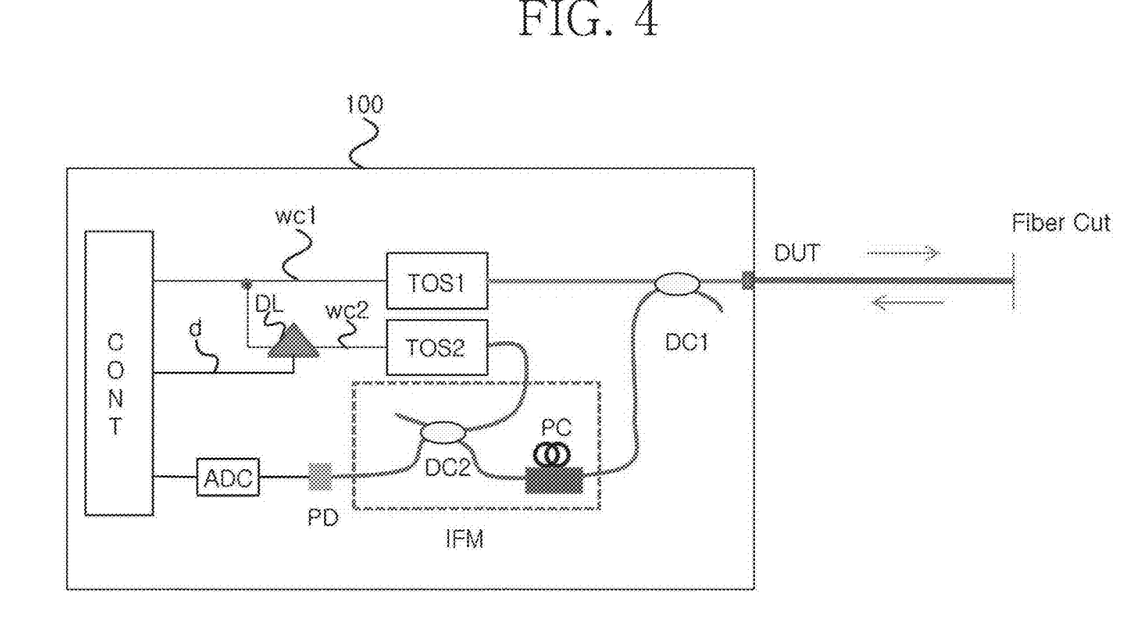
FIG. 4 is a block diagram of an optical line testing device according to an embodiment of the present invention.

FIG. 4 is a block diagram of an optical line testing device 100 according to an embodiment of the present invention.

The optical line testing device 100 according to an embodiment of the present invention is for measuring at least a cutting position of an optical line and includes a first wavelength tunable laser source TOS1, a second wavelength tunable laser source TOS2, a delay unit DL, a first directional coupler DC1, an optical signal receiver PD, an analog-to-digital converter ADC, a signal processing and controlling unit CONT, and an interferometer IFM.

The first and second wavelength tunable laser sources TOS1 and TOS2 receive a wavelength control signal from the signal processing and controlling unit CONT and output light of a wavelength corresponding thereto.

The first and second wavelength tunable laser sources TOS1 and TOS2 may include, for example, a polymer wavelength tunable laser.

Figure 5:
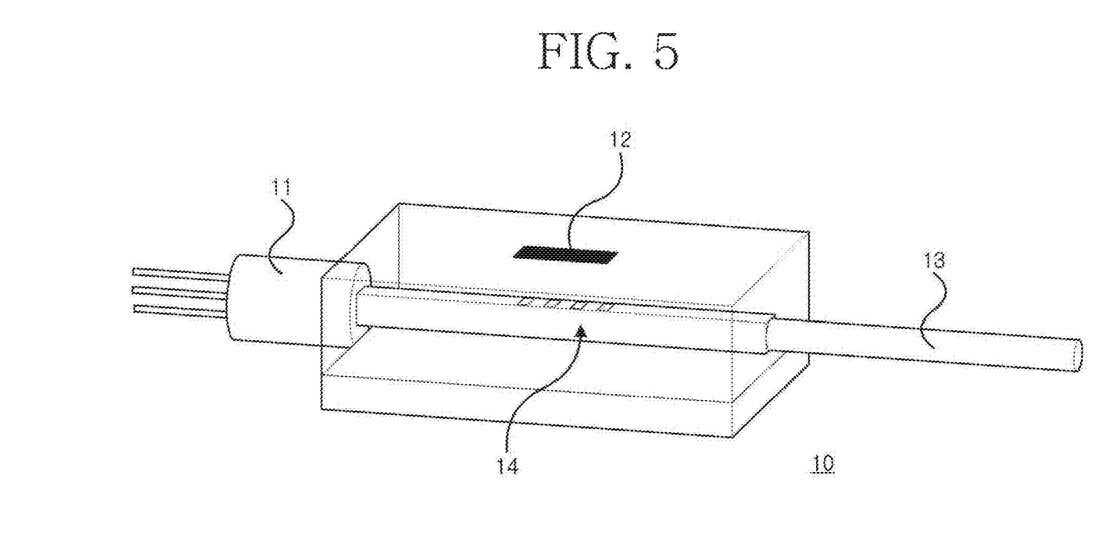
FIG. 5 is a view of a polymer wavelength tunable laser.

FIG. 5 is a view of the polymer wavelength tunable laser 10 used in a wavelength tunable laser source according to an embodiment of the present invention.

The polymer wavelength tunable laser 10 outputs an optical signal of a tunable wavelength. The polymer wavelength tunable laser 10 includes a laser diode 11 for outputting a Continuous Wave (CW) optical signal and with an anti-reflection coating on a surface, a polymer Bragg-grating waveguide 14 for controlling a wavelength of a CW laser through external resonance with the laser diode 11, and a heating electrode 12 for changing and controlling a temperature of a Bragg grating by applying heat to the polymer Bragg-grating waveguide 14.

The polymer Bragg-grating waveguide 14 is formed by fabricating a waveguide with a polymer material and forming a Bragg grating on the waveguide, wherein a Bragg-grating waveguide is a passive optical device that reflects only an optical signal of an optical wavelength $\lambda 1$ determined by a grating interval from among optical signals of various incident wavelengths and passes the remaining wavelengths.

Therefore, in an optical output of the laser diode 11 with an anti-reflection coating on a surface, the optical signal of the optical wavelength $\lambda 1$ is reflected by the polymer Bragg-grating waveguide 14 and returns to the laser diode 11. Therefore, the laser diode 11 and the polymer Bragg-grating waveguide 14 function as an external resonator, and as a result, the laser diode 11 outputs the optical signal of the optical wavelength $\lambda 1$.

Meanwhile, a polymer has a thermo-optic effect and has a characteristic that a refractive index is changed by heat. Therefore, the polymer Bragg-grating waveguide 14 may tune an optical wavelength reflected by the heat applied by the heating electrode 12 to another optical wavelength $\lambda 2$, and accordingly a resonance wavelength between the laser diode 11 and the polymer Bragg-grating waveguide 14 is tuned. As a result, the laser diode 11 outputs an optical signal of the optical wavelength $\lambda 2$.

For example, the first and second wavelength tunable laser sources TOS1 and TOS2 including the polymer wavelength tunable laser 10 output light of a corresponding wavelength by wavelength control signals wc1 and wc2.

Figure 6A:
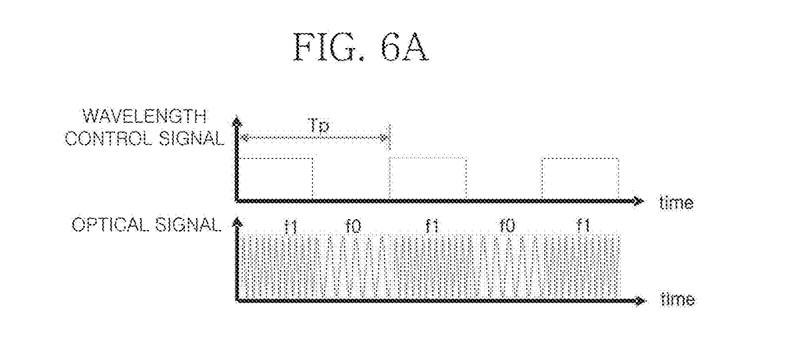
FIG. 6A is a view of a relationship between a wavelength control signal and an optical signal output from a wavelength tunable laser source according to the wavelength control signal.

FIG. 6A is a view of a relationship between a wavelength control signal and an optical signal output from a wavelength tunable laser source according to the wavelength control signal.

Characteristically, the first and second wavelength tunable laser sources TOS1 and TOS2 in the present invention generate an optical signal in which a plurality of wavelengths appear alternately and periodically, and optical power of the optical signal is constant or at least continuous. An output optical signal of a wavelength tunable laser source has a wavelength repetition period in which wavelengths repeatedly appear, and thus a wavelength control signal, which is an electrical signal for controlling the wavelength tunable laser source, also has a period Tp.

Referring again to FIG. 4, the first wavelength tunable laser source TOS1 is controlled by the first wavelength control signal wc1, and the first wavelength control signal wc1 controls the first wavelength tunable laser source TOS1 so that the first wavelength tunable laser source TOS1 may generate the optical signal in which a plurality of wavelengths appear alternately and periodically.

Furthermore, the second wavelength tunable laser source TOS2 is controlled by the second wavelength control signal wc2 which is identical to the first wavelength control signal wc1 but has an adjustable delay time, and the second wavelength control signal wc2 controls the second wavelength tunable laser source TOS2 so that the second wavelength tunable laser source TOS2 may generate the optical signal in which a plurality of wavelengths appear alternately and periodically.

The first wavelength tunable laser source TOS1 generates a first optical signal in which a plurality of wavelengths appear alternately and periodically, and the second wavelength tunable laser source TOS2 generates a second optical signal which is identical to the first optical signal but has an adjustable delay time.

The delay unit DL outputs the second wavelength control signal wc2 by delaying the first wavelength control signal wc1 by the delay time, and the signal processing and controlling unit CONT controls the delay time of the delay unit DL by a control signal d.

The first directional coupler DC1 emits an optical signal output from the first wavelength tunable laser source TOS1 to an optical line DUT to be measured and transmits a portion of light returning from a cut surface of the optical line DUT to a polarization controller PC of the interferometer IFM.

The interferometer IFM receives a reflected optical signal, corresponding to the first optical signal, which is returning after having been emitted to the optical line DUT, and the second optical signal, and causes interference between the reflected optical signal and the second optical signal to output an interference signal.

The interferometer IFM has two input ports and one output port, and one of the two input ports receives the reflected optical signal from the first directional coupler DC1 and the other one receives the second optical signal from the second wavelength tunable laser source TOS2.

Generally, the two optical signals have different polarizations. It is a general structure of an interferometer to place the polarization controller PC in one of the two ports because no interference occurs if the polarizations do not match each other.

The interferometer IFM includes a second directional coupler DC2 and a polarization controller PC, wherein the polarization controller PC is for matching the polarizations of the reflected optical signal and the second optical signal, and the second directional coupler DC2 transmits an optical signal from the polarization controller PC and the second optical signal to the optical signal receiver PD.

The optical signal receiver PD receives an optical signal output from the interferometer IFM and converts the optical signal into an electrical signal, and the analog-to-digital converter ADC converts an analog electrical signal into a digital electrical signal.

The signal processing and controlling unit CONT manages an operation of the entire optical line testing device 100, particularly provides a control signal for controlling a wavelength tunable laser source and a delay unit, receives a digital electrical signal from the analog-to-digital converter ADC to perform signal processing, and calculates at what point an optical line is cut.

Hereinafter, an operation of an optical line testing device of the present invention will be described with reference to FIGS.

The signal processing and controlling unit CONT applies the first wavelength control signal wc1 to the first wavelength tunable laser source TOS1. The first wavelength tunable laser source TOS1 outputs an optical signal in which output wavelengths change alternately according to a control signal as shown in FIG. 6A, and the optical signal is incident on the optical line DUT to be measured.

Thereafter, light reflection occurs at a cut surface of the optical line DUT, and a portion of the optical signal sent from the first wavelength tunable laser source TOS1 is reflected back to an original position and proceeds backwards. A portion of the proceeding optical signal is input to the interferometer IFM by the first directional coupler DC1.

The interferometer IFM has two input ports and one output port, wherein one of the two input ports receives an optical signal from the first directional coupler DC1 and the other one receives an optical signal from the second wavelength tunable laser source TOS2, and the polarization controller PC controls and matches polarizations of the two optical signals.

An output of the interferometer IFM is input to the optical signal receiver PD and an output electrical signal of the optical signal receiver PD is input to the signal processing and controlling unit CONT via the analog-to-digital converter ADC, wherein the output electrical signal is used to determine a position of a cut surface in an optical line.

Hereinafter, a principle of measurement using an optical line testing device according to an embodiment of the present invention will be described step by step starting from an assumption.

First, it is assumed that a length of the optical line DUT to be measured is zero and a length of all internal optical lines in the optical line testing device 100 is also zero.

Figure 6B:
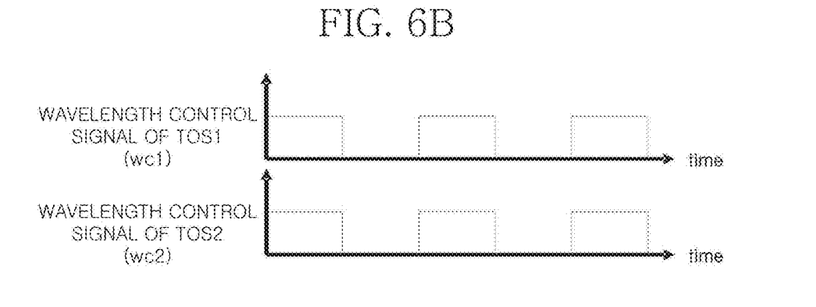
FIG. 6B is a view of a relationship between two wavelength control signals when an output of an optical signal receiver is maximum.

With this assumption, a case where a delay time Td between the first wavelength control signal wc1 applied to the first wavelength tunable laser source TOS1 and the second wavelength control signal wc2 applied to the second wavelength tunable laser source TOS2 is set to 0 will be described. For example, a shape of the two wavelength control signals is as shown in FIG. 6B.

In this case, there is no delay time between the signals of the first wavelength tunable laser source TOS1 and the second wavelength tunable laser source TOS2, and thus an interference effect between the two optical signals reaching the interferometer IFM is maximized and an output of the optical signal receiver PD is maximized (the output is referred to as PD_max).

Figure 6C:
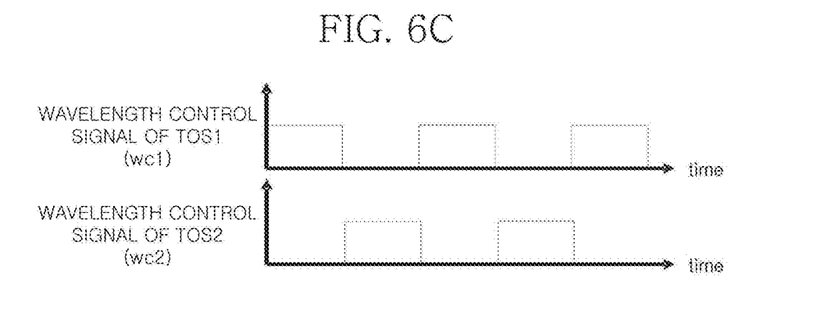
FIG. 6C is a view of a relationship between two wavelength control signals when an output of an optical signal receiver is minimum.

A case where the delay time Td is applied between the first wavelength control signal wc1 applied to the first wavelength tunable laser source TOS1 and the second wavelength control signal wc2 applied to the second wavelength tunable laser source TOS2 will be described in FIG. 6C.

In this case, since a frequency difference between the signals of the first wavelength tunable laser source TOS1 and the second wavelength tunable laser source TOS2 is the greatest, an output of the optical signal receiver PD becomes minimum (the output is referred to as PD_min).

Figure 7A:
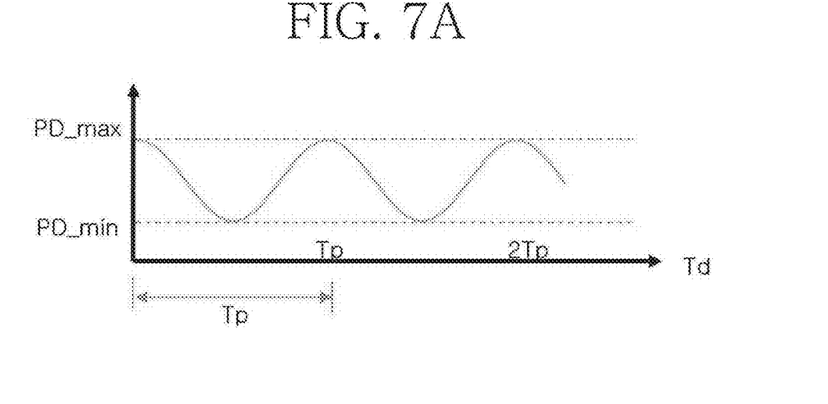
FIG. 7A is a graph of an output of an optical signal receiver according to a delay time when it is assumed that a length of an optical line to be measured is zero and a length of all internal optical lines in an optical line testing device is also zero.

FIG. 7A is a graph of an output of the optical signal receiver PD according to the delay time Td when it is assumed that a length of the optical line DUT to be measured is zero and a length of all internal optical lines in the optical line testing device 100 is also zero.

As shown in FIG. 7A, when an output of the optical signal receiver PD is displayed in a graph while varying the delay time Td, a repetitive pattern in which the period Tp of a wavelength control signal is one cycle appears (a horizontal axis in the graph is the delay time Td).

It is determined how the output of the optical signal receiver PD varies when there is a length of the optical line DUT to be measured (an actual length of the optical line DUT to be measured is not 0 but L(m)). It is assumed that a round trip time when light travels to the end of an optical line of length L(m) and then reflects back is 2Tr.

Figure 7B:
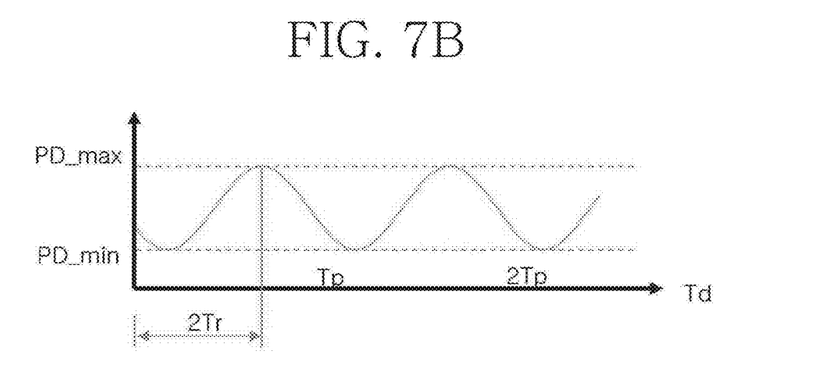
FIG. 7B is a graph of an output of an optical signal receiver according to a delay time when there is a length difference in a path of an optical line.

First, an output of the optical signal receiver PD will be displayed in the graph while gradually increasing the delay time Td in a state where the delay time Td is zero as shown in FIG. 7B. Then, the delay time Td at a point where the output becomes maximum in the graph will be 2Tr described above. This is because a signal of an interferometer becomes maximum when the round trip time 2Tr via the optical line DUT to be measured is equal to the delay time Td of a signal transmitted to the second wavelength tunable laser source TOS2.

In this way, the light beam tester 100 may determine a value of the round trip time 2Tr, and may calculate that a cut surface of an optical line is located at a distance L from the value.

The optical line testing device 100 according to an embodiment of the present invention measures an output of an interference signal while varying the delay time Td, wherein the interferometer IFM is used to output the interference signal by causing interference between a reflected optical signal, corresponding to a first optical signal, which is returning after having been emitted to an optical line, and a second optical signal to which a delay time is given. Then, a cutting position of the optical line is calculated using the delay time at which the measured output becomes maximum.

The first optical signal generated from the first wavelength tunable laser source TOS1, which is one of two wavelength tunable laser sources, is emitted to the optical line, and the variable delay time Td is given to the second optical signal generated from the second wavelength tunable laser source TOS2, which is the other one of the two wavelength tunable laser sources.

According to an embodiment of the present invention, the cutting position is measured by using an interference effect when the round trip time 2Tr, corresponding to the first optical signal, which is returning after having been emitted to the optical line, is equal to or an integral multiple of the delay time Td of the second optical signal.

Figure 8A:
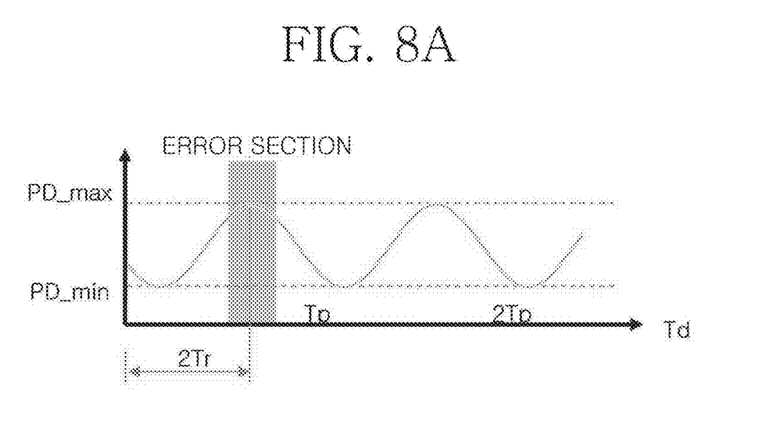
FIG. 8A is a view for explaining that a maximum point in an output of an optical signal receiver is not clearly distinguished.

Meanwhile, it is possible to determine a position of the cut surface of the optical line if the period Tp of the wavelength control signal is increased, but it is difficult to determine the exact position. This is because a maximum point of PD_max is not clearly distinguished as shown in FIG. 8A.

In order to solve the problem, in the other embodiment of the present invention, a plurality of wavelength control signals having different periods are used to measure the cutting position.

Figure 9A:
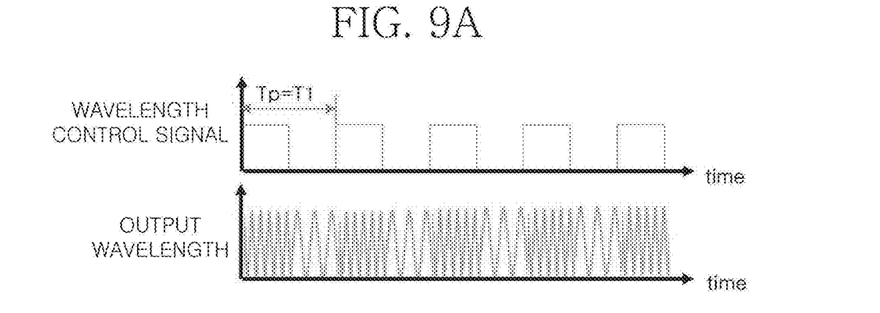
FIGS. 9A to 9C are views of a plurality of wavelength control signals having different periods and an output of a wavelength tunable laser source according to each of the plurality of wavelength control signals.
Figure 9B:
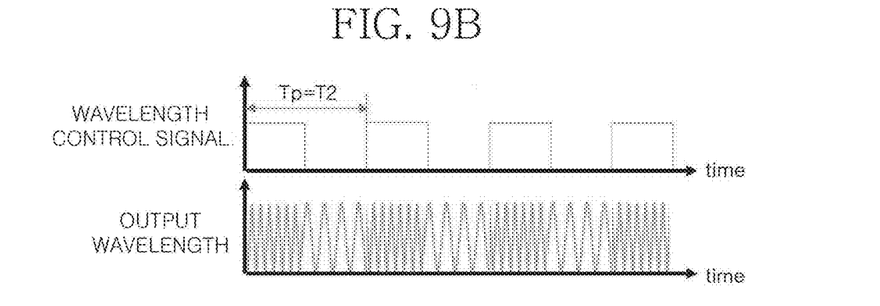
Figure 9C:
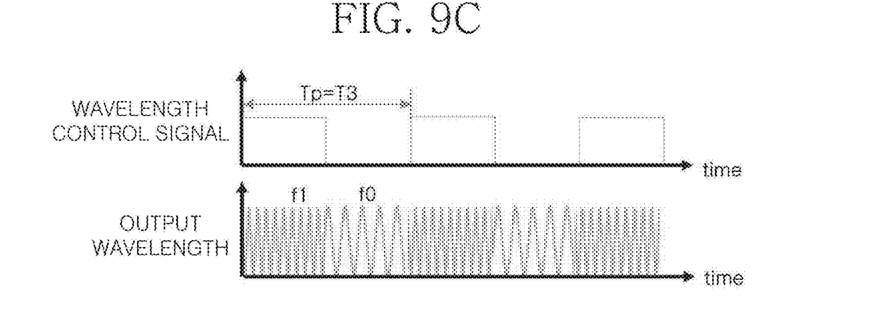

FIGS. 9A to 9C are views of a plurality of wavelength control signals having different periods and an output of a wavelength tunable laser source according to each of the plurality of wavelength control signals, wherein FIG. 9A shows a case where the period Tp of the wavelength control signal is T1, FIG. 9B shows a case where the period Tp of the wavelength control signal is T2, and FIG. 9C shows a case where the period Tp of the wavelength control signal is T3 (T1≠T2≠T3).

Figure 8B:
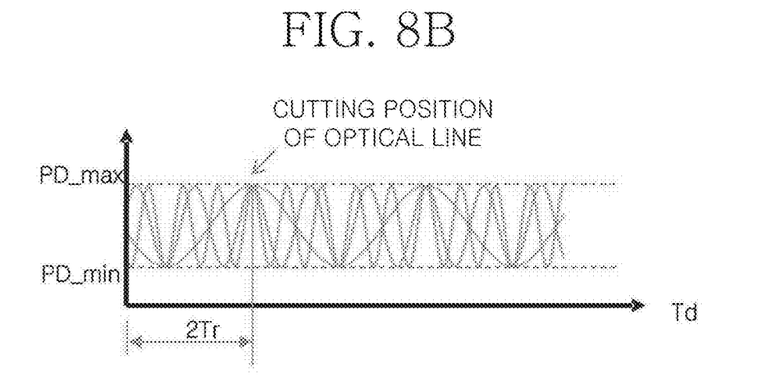
FIG. 8B is a view for explaining a situation of using a wavelength control signal having a plurality of different periods.

FIGS. 9A to 9C may be the same as FIG. 8B when the optical line testing device 100 sequentially measures an output of an interference signal while varying the period Tp of the wavelength control signal, and displays outputs of the optical signal receiver PD superimposed on a graph.

According to the other embodiment of the present invention, accurate position information of an optical line is determined by superimposing interference results obtained by using wavelength control signals having different periods.

The period Tp of the wavelength control signal becomes equal to a period in which any one wavelength appears repeatedly in an optical signal output from a wavelength tunable laser source (hereinafter, referred to as a 'wavelength repetition period').

According to the other embodiment of the present invention, an output of an interference signal is measured while varying the delay time Td for two or more different wavelength repetition periods, and in all of the two or more different wavelength repetition periods, a cutting position is calculated using a delay time at which the measured output becomes maximum.

Hereinafter, effects according to configurations of the present invention will be described.

According to a conventional optical line testing device, it is impossible to increase a magnitude of an optical pulse by more than a certain limit by using a method of detecting a cutting position of an optical line using the optical pulse in which optical power changes abruptly. If the magnitude of the optical pulse is greater than a certain limit, a nonlinear effect occurs between the optical line and the optical pulse, so that a measurement error occurs, and if a width of the optical pulse is increased, the resolution is deteriorated.

Meanwhile, according to an embodiment of the present invention, optical power of a used optical signal is constant or continuous, so that even if the optical power increases, a nonlinear effect between the optical signal and an optical line does not occur or decreases.

Therefore, according to an embodiment of the present invention, even if optical power of an optical signal for measurement is increased, a dynamic range may be greatly improved without sacrificing a resolution of an optical line testing device.

According to an embodiment of the present invention, it is possible to provide an optical line testing device with excellent resolution and dynamic range, and to precisely measure a cutting position or the like on a long-distance optical line.

Furthermore, according to an embodiment of the present invention, it is possible to minimize a nonlinear effect caused by a measured optical signal in an optical line so that an optical amplifier such as an Erbium Doped Fiber Amplifier (EDFA) may be used.

The invention claimed is:

1. An optical line testing device for measuring at least one cutting position of an optical line, the optical line testing device comprising:
    a first wavelength tunable laser source configured to generate a first optical signal in which a plurality of wavelengths appear alternately and periodically such that each wavelength appears repeatedly at a wavelength repetition period, and output the generated first optical signal to the optical line;
    a second wavelength tunable laser source configured to generate a second optical signal which is identical to the first optical signal but has an adjustable delay time;
    an interferometer configured to cause interference between a reflected optical signal of the first optical signal reflected from the optical line and the second optical signal, and output an interference signal caused by the interference between the reflected optical signal and the second optical signal; and
    a processor configured to adjust the delay time of the second optical signal and measure the cutting position based on the interference signal and the delay time.

2. The optical line testing device of claim 1, wherein the processor is configured to calculate the cutting position by using a delay time at which the interference signal becomes maximum.

3. The optical line testing device of claim 1, wherein the processor is configured to measure the interference signal while adjusting the delay time for two or more different wavelength repetition periods, and in all of the two or more different wavelength repetition periods, calculate the cutting position using a delay time at which the interference signal becomes maximum.

4. The optical line testing device of claim 1, wherein optical power of the first optical signal and the second optical signal is constant or continuous.

5. The optical line testing device of claim 1, wherein the interferometer includes a polarization controller for matching polarizations of the reflected optical signal and the second optical signal.

6. The optical line testing device of claim 1, further comprising:
    an optical signal receiver configured to convert the interference signal into an electrical signal.

7. The optical line testing device of claim 1, wherein the processor is configured to measure the cutting position using an interference effect of the interference when a round trip time of the first optical signal is equal to or an integral multiple of the delay time of the second optical signal.

8. An optical line testing device for measuring at least one cutting position of an optical line, the optical line testing device comprising:
    a first wavelength tunable laser source controlled by a first wavelength control signal and configured to:
        generate a first optical signal in which a plurality of wavelengths appear alternately and periodically such that each wavelength appears repeatedly at a wavelength repetition period, and
        output the generated first optical signal to the optical line;
    a second wavelength tunable laser source controlled by a second wavelength control signal which is identical to the first wavelength control signal but has a delay time to generate a second optical signal; and
    an interferometer configured to output an interference signal by causing interference between a reflected optical signal of the first optical signal from the optical line and the second optical signal; and
    a processor configured to adjust the delay time of the second optical signal and measure the cutting position based on the interference signal and the delay time.

9. The optical line testing device of claim 8, wherein the processor is
    configured to output the second wavelength control signal by delaying the first wavelength control signal by the delay time.

10. The optical line testing device of claim 8, wherein the processor is configured to calculate the cutting position by using a delay time at which the interference signal becomes maximum.

11. The optical line testing device of claim 8, wherein the processor is configured to measure the interference signal while adjusting the delay time for two or more different wavelength repetition periods, and in all of the two or more different wavelength repetition periods, calculate the cutting position using a delay time at which the measured interference signal becomes maximum.

12. The optical line testing device of claim 8, wherein optical power of the first optical signal and the second optical signal is constant or continuous.

13. The optical line testing device of claim 8, wherein
the interferometer includes a polarization controller for
matching polarizations of the reflected optical signal
and the second optical signal.

14. The optical line testing device of claim 8, further comprising:
an optical signal receiver configured to convert the interference signal into an electrical signal.

15. The optical line testing device of claim 8, wherein
the processor is configured to measure the cutting position using an interference effect of the interference when a round trip time of the first optical signal is equal to or an integral multiple of the delay time of the second optical signal.

* * * * *